United States Patent [19]

Hamma et al.

[11] 4,187,739
[45] Feb. 12, 1980

[54] HYDROSTATIC TORQUE CONVERTER HAVING A STEPPED TRANSMISSION

[75] Inventors: Karlmann Hamma; Anton Ott, both of Tettnang; Werner Vetter; Arun Chatterjee, both of Friedrichshafen, all of Fed. Rep. of Germany

[73] Assignee: Zahnradfabrik Friedrichshafen AG, Friedrichshafen, Fed. Rep. of Germany

[21] Appl. No.: 860,162

[22] Filed: Dec. 13, 1977

[51] Int. Cl.² ............................................. F16H 47/00
[52] U.S. Cl. ....................................... 74/732; 74/733; 74/859
[58] Field of Search ................. 74/859, 856, 867, 868, 74/687, 745, 732, 733; 192/109 F, 87.13, 87.14, 87.18, 87.19; 60/494; 91/444, 448

[56] References Cited

U.S. PATENT DOCUMENTS

| 3,864,991 | 2/1975 | Nembach ............................. 74/687 |
| 3,896,705 | 7/1975 | Patton ............................. 192/109 F X |
| 3,948,146 | 4/1976 | Maurer et al. .................. 192/109 F X |
| 3,969,958 | 7/1976 | Miyao et al. ............................ 74/687 |

FOREIGN PATENT DOCUMENTS 1817764  2/1971  Fed. Rep. of Germany ............. 74/687

*Primary Examiner*—C. J. Husar
*Assistant Examiner*—Frank McKenzie
*Attorney, Agent, or Firm*—Karl F. Ross

[57] ABSTRACT

A hydrostatic torque converter has a hydrostatic transmission and a stepped or gear transmission shiftable under load by selective actuation of respective clutches assigned to the gear trains. The variable-displacement pump is controlled hydrostatically to follow the switch-over between clutches with the control pressure to the servocontrolling the displacement of the pump being regulated in response to the fluid pressures of the clutches through respective pressure modulation valves. As a consequence, the hydrostatic transmission compensates for the jump resulting from the shifting of the steps of the gear transmission and follows the stepping of the gear transmission outside the forced actuation of the transmission (positive switching overlap of the shifting clutches) in dependence upon the progress of load transfer from the released to the engaged clutch.

7 Claims, 1 Drawing Figure

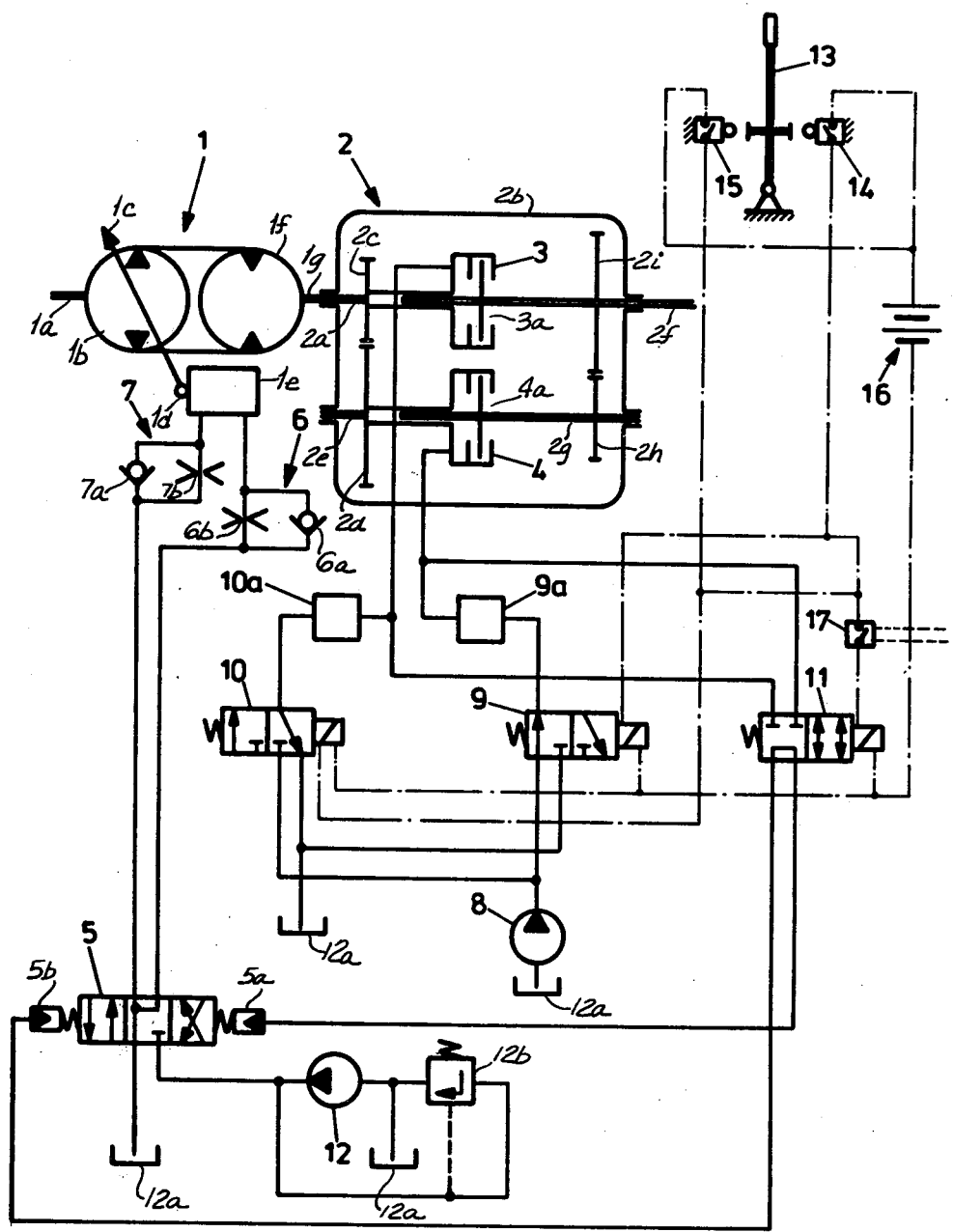

HYDROSTATIC TORQUE CONVERTER HAVING A STEPPED TRANSMISSION

FIELD OF THE INVENTION

The present invention relates to a hydrostatic torque converter of the type which comprises a hydrostatic input transmission connected to a stepped gear transmission shiftable under load. More particularly, the invention relates to improvements in a control system for the hydrostatic input transmission of a torque converter of this type or the like.

BACKGROUND OF THE INVENTION

Hydrostatic torque converters, generally speaking, are intended to be disposed between an engine and a load and have, as is the case with all torque converters, an input element, generally a shaft connected with the engine, and an output element which is usually also a shaft and is connected with the load. Between the input element and the output element, means is provided for adjusting the transmission ratio and torque transmission between the shafts.

In the case of a hydrostatic torque converter, as opposed to a hydrodynamic torque converter, the input shaft generally drives a variable-displacement hydrostatic pump (e.g. an axial-piston pump whose displacement per revolution is adjusted by tilting a control plate, disk, or cylinder drum), the hydrostatic pump being hydraulically connected to a hydrostatic motor which can be of the fixed displacement axial piston type. The hydrostatic pump and hydrostatic motor together form a hydrostatic transmission and the motor shaft is generally connected to the input side of a stepped gear transmission which is shiftable under load. In a stepped gear transmission shiftable under load of this type, a driving connection is effected between the input shaft of the gear transmission and the output shaft thereof, the latter constituting the output shaft of the torque converter, by engaging selectively one of a plurality of clutches to establish effective gear trains between the shafts.

The process of switching over between the steps of such a transmission consists in deactuating one of the clutches of a previously effective gear train and engaging or actuating a clutch of another gear train which is to take over the driving operation.

It is a common practice in such torque converters to control the hydrostatic transmission of the apparatus by a servopiston which can be connected to the stroke or displacement controlling element of the pump, in order to compensate for the jump in speed which would otherwise result from the shifting of steps in the gear transmission.

In other words, a servo- or regulating piston is provided in a power controller and is connected to the control element of the hydraulic pump, this piston being displaced in response to a control valve in a hydraulic control circuit. The valve, in turn, is shifted in response to signals applied to the clutches to be switched.

In a conventional hydrostatic torque converter of this type, described, for example, in the open German application (Offenlegungsschrift) DT-AS No. 2,237,595, the variable displacement pump of the hydrostatic component of the torque converter follows the gear-transmission shifting under load to effect a speed equalization or compensation for the step in transmission ratios of the gear transmission.

In this system, the pump has its stroke or displacement controlling element connected to a servopiston which responds to a speed sensor via the switching valve mentioned previously. In this arrangement, the clutch speeds at each instant during the stepping of the gear transmission are detected and serve as inputs for controlling the valve which, in turn, operates the servomechanism for controlling the displacement of the stroke control element of the pump.

The speed signal operates independently of the load transfer between the generation of the switch command to synchronization of the clutching.

When this type of torque converter is used, especially in a series assembly with others, the positive or negative overlap of the load variation from disengaged to engaged clutch does not always result in a shock-free transition.

It has been proposed (see published German Application-Auslegeschrift-DT-AS No. 2,237,595) to use the clutch switching pressure directly at the instant of switchover of the gear transmission to operate the hydrostatic component of the transmission. This control system, however, causes the variable displacement pump to be actuated immediately upon initiation of the transition ratio switchover of the gear transmission so that, during the forced actuation phase, corresponding to positive switchover lap of the clutches, the compensating adjustment of the hydrostatic component has already commenced or been completed. As a consequence, the adjustment of the hydrostatic component is effective before the selected step of the mechanical transmission has completely taken over the load and a shock is imparted to the load. When the load is the driving wheels of a vehicle, this system results in a jerky gear change of the vehicle operation.

The term "forced actuation" as it refers to a positive overalp of the operations of the clutches of the mechanical transmission is discussed in greater detail below. However, for better understanding of the prior-art systems, it should be appreciated that this phase in the operation of the mechanical transmission is the phase in which both gear trains are coupled simultaneously between the input shaft and the output shaft of the gear transmission. In a load-shiftable transmission, i.e. a transmission shiftable under load, this phase or period corresponds to the interval at which the clutch to be de-energized is still practically fully engaged although hydraulic fluid is in the process of being drained from its actuating element, while hydraulic fluid is in the process of being fed to the actuating element of the clutch of the gear train intended to take over the load. During this interval, both clutches are at least partially engaged and the gear system between the input and output shafts of the gear transmission, because of the different transmission ratios, results in slip in one or both clutches.

Another system has been described in German published application (Auslegeschrift) DT-AS No. 1,817,764 in which the hydrostatic component of the torque converter is actuated to follow the shifting of gears only upon complete actuation of the clutch to be energized and while the clutch to be de-energized has not been fully disengaged. Here, too, a jerky movement is imparted to the load and hence to the vehicle.

OBJECTS OF THE INVENTION

It is the principal object of the present invention to provide a torque converter of the type described which, however, avoids the disadvantages of the prior-art systems discussed above.

Another object of the invention is to provide an improved torque converter which is free from the jerky movements characterizing earlier systems.

Still another object of the invention is to provide an improved control system for a torque converter of the type in which a hydrostatic transmission is connected to a gear transmission shiftable under load.

SUMMARY OF THE INVENTION

These objects and others which will become apparent hereinafter are attained, in accordance with the present invention, in a torque converter which comprises a hydrostatic component connected to the input shaft and driven, e.g. by an engine for propelling a vehicle, and a stepped gear transmission shiftable under load and connected to the hydrostatic transmission, the gear transmission being connected to the output or load shaft which, in turn, is connected, if desired, to the wheels of the vehicle. According to the invention, the hydrostatic transmission is provided with a variable displacement pump whose control element is displaced by a hydraulic actuator reversibly responsive to hydraulic fluid delivered by a switching valve.

The charging and discharging pressures of the clutches of the stepped gear transmission are used as control pressures for this valve, i.e. to displace the valve member, through respective pressure modulation valves which are provided in the feed and return lines of the clutches. As a consequence, the adjustment of the hydrostatic transmission or component of the torque converter upon step-switching of the gear transmission is effected outside the forced actuation phase of the gear transmission (positive overlap of the operations of the switching clutches) in dependence upon the progress of load transfer from the disengaged to the engaged clutch.

In the system of the present invention, during the gear-change operation, the charging pressure of the clutch to be energized or engaged and the discharging pressure of the clutch to be disengaged are applied to the switching valve of the hydraulic actuator of the pump through pressure modulation valves in the feed or return lines of the clutch, these pressure modulation valves shifting the operation of the hydrostatic transmission from the forced-actuation time period to a subsequent period enabling the jerky operation of the torque converter, characterizing earlier systems, to be eliminated.

In other words, the hydrostatic transmission is not shifted during the forced acutating phase of the transmission, i.e. the phase in which one clutch is still closed while the other has already begun to take up torque. Practically all transmissions shiftable under load of the type described have a forced actuation phase becuase the operations of the clutches have a natural overlap, especially when the clutches are so-called plate or lamella clutches. This overlap depends upon the loading of the clutches and the speed as well as the size of the clutches involved.

By the use of pressure-modulation valves in combination with control of the hydrostatic transmission by the clutch switching pressures, it is possible to obtain an adjustment of the speed compensation by the hydrostatic transmission to follow load transfer outside of the forced actuation phase and without any of the jerky responses noted earlier.

BRIEF DESCRIPTION OF THE DRAWING

The above and other objects, features and advantages of the present invention will become more readily apparent from the following description, reference being made to the accompanying drawing in which the sole FIGURE is a hydraulic and signal circuit diagram of a control system embodying the present invention, the mechanical elements of which are shown only diagrammatically.

SPECIFIC DESCRIPTION

In the drawing we show a torque converter which comprises a hydrostatic transmission 1 and a stepped gear transmission 2 shiftable under load. The hydrostatic transmission 1 has an input shaft 1a which can be connected to an internal combustion engine of an automotive vehicle and which drives a hydrostatic pump 1b which can be of the axial-piston type. This pump has a control element, e.g. a swash plate 1c which is shiftable to control the displacement per revolution of the pump, e.g. by controlling the axial strokes of the pistons thereof.

In accordance with conventional axial-piston pump practice, the control element 1c can be displaced by a hydraulic servomotor which can include a piston 1d in a double-action cylinder 1e.

The axial-piston pump 1b is connected to a hydrostatic motor 1f which can be of the fixed-displacement axial piston type and can have an output shaft 1g forming the input shaft 2a of the gear transmission 2.

The transmission 2 has a housing 2b in which the shaft 2a is journaled, the shaft 2a carrying a gear 2c which meshes with a gear 2d mounted upon another shaft 2e journaled in the housing 2b parallel to the shaft 2a. The shaft 2a also carries one of the elements of a plate clutch 3 which can engage the disk 3a, forming the other element of this clutch, mounted upon the output shaft 2f of the transmission. The shaft 2f can be connected to the wheels of the vehicle. Thus, when clutch 3 is engaged, the shaft 2a is coupled directly to the shaft 2f and a transmission ratio of unity is provided between them.

The shaft 2e, correspondingly, carries one element of a hydraulically actuatable clutch 4 whose element 4a is mounted upon a shaft 2g coaxial with shaft 2e and rotatable relatively thereto when clutch 4 is disengaged. The shaft 2g carries a gear 2h meshing with the gear 2i on output shaft 2f. Thus when clutch 4 is engaged, the transmission path is effected from input shaft 2a via gear 2c and gear 2d to shaft 2e and thence via clutch 4 to shaft 2g, the gear 2h, the gear 2i and the output shaft 2f. The transmission ratio for this step is determined by the gear teeth relationship as is well known in the art. The clutches 3 and 4 are able to be selectively engaged to shift steps of the gear transmission while the shaft 2f is loaded.

The cylinder 1e receives hydraulic fluid through respective diaphragm-type control networks 6 and 7, each of which includes a check valve 6a, 7a, admitting fluid freely to the cylinder but blocking flow of fluid therefrom. In parallel with each check valve 6a, 7a, there is a respective throttle 6b, 7b so that the outflow from the respective cylinder compartment is contricted.

Fluid is fed from a pump 12 and a reservoir 12a through a switch valve 5 whose valve member has three positions. In the position illustrated, the valve 5 blocks fluid from the pump 12 so that the fluid is bypassed through a pressure relief valve 12b. Both sides of the cylinder 1e are drained in this position and the control element 1c is held in place. In the two extreme positions of the valve 5, fluid is fed to one side or the other of the cylinder 1e and drained from the opposite side to the reservoir thereby displacing the control element 1c in one or the other sense. The valve 5 has oppositely effective compartments 5a and 5b to which control pressure can be applied from a valve 11 to displace the valve 5 from its neutral position shown into either of its extreme positions. The valve 11 is of the solenoid type and has two positions. In the one illustrated as effective in the drawing, control pressure is not applied to the valve 5. In the other position, therefore, control pressure is delivered to the valve 5 at a level determined by the pressure modulation valves 9a and 10a between the solenoid control valves 9 and 10 and the respective clutches 4 and 3. Each of the valves 9 and 10 is of the reversible type enabling selective energization or de-energization of the respective clutches. The valves 9 and 10 are supplied with control pressure from a pump 8 and the reservoir 12a.

The gear-shifting lever 13 can selectively actuate switches 14 and 15 in series with the vehicle battery 16 and the solenoid valve 11. In addition, these switches are connected in series respectively with the electromagnets of the valves 9 and 10.

Using the gear-shifting lever 13, the contacts 14 or 15 can be closed to operate the valves 9 and 10, selectively and thereby engage and disengage the respective clutches. Valve 9, for example, engages the clutch 4 of first gear while valve 10 engages the clutch 3 of the second gear of the transmission. The pressure modulation valves 9a and 10a between the valves 9 and 10 and the clutches 4 and 3, respectively, control the progress of engagement of the clutches, e.g. by delaying same while the discharge from the clutch which is disengaged is unthrottled. The pressure at the two clutches is applied via the valve 11 to the control valve 5 of the servomotor 1e for the hydrostatic transmission to effect a speed compensation for the gear-shifting operation.

A switch 17 in series with the electromagnetic valve 11 can interrupt the adjustment of the hydrostatic transmission when the desired speed compensation has been achieved. The switch 17 can be operated by detecting the displacement of the control element 1c via a limit switch but preferably is opened upon detection of a speed equalization at the input and output sides of the clutch to be engaged. The pump 12 can also be the filling pump for the hydrostatic transmission and unit 6 and 7 throttle the discharge from the cylinder 1e while permitting the suppy of the fluid thereto to be unthrottled. Naturally, instead of an electrical system 14–17, a pneumatic or hydraulic arrangement can be provided.

We claim:

1. A hydrostatic torque converter comprising:
   an input shaft and an output shaft;
   a hydrostatic transmission including a variable displacement pump connected to and driven by said input shaft and a hydrostatic motor hydraulically connected to said pump, said pump having a control element for varying the displacement per revolution thereof;
   a stepped gear transmission shiftable under load connected between said motor and said output shaft, said gear transmission having at least two selectively engageable and disengageable clutches establishing respective transmission ratios of the gear transmission;
   selector means including control valves for selectively feeding fluid to said clutches and discharging fluid from said clutches for the engagement and disengagement thereof to select one of said transmission ratios;
   a switch valve connected with said hydrostatic transmission for controlling the displacement of said element;
   means for applying the fluid pressure at said clutches to said switch valve for controlling same in response to selection of a transmission ratio to adjust said hydrostatic transmission for speed compensation upon switchover between said transmission ratios; and
   pressure modulation valves in fluid connection with said clutches for modifying the rate of engagement thereof such that the adjustment of the hydrostatic transmission for speed compensation is effected outside the period wherein the clutch to be disengaged is still in an engaged condition and the clutch to be engaged has been subjected to incipient loading.

2. The torque converter as defined in claim 1 wherein said selector means includes a source of fluid pressure, respective two-position control valves connected between said source and each of said clutches, said pressure modulation valves being provided between each of said control valves and the respective clutches, said switch valve having a pair of oppositely effective pressurizable compartments each connected to a respective one of said clutches between the clutch and the respective pressure modulation valve.

3. The torque converter as defined in claim 2 wherein said selector means further comprises a selector lever shiftable between two positions and respective switches in circuit with said control valves and alternatively operable by said lever, said switches being connected in circuit with a further valve disposed hydraulically between said compartment and said clutches.

4. The torque converter as defined in claim 3 wherein said further valve is in circuit with a cut-off switch for terminating adjustment of said hydrostatic transmission, said further switch being open-circuited upon attainment of speed equalization between the opposite sides of the clutch to be engaged.

5. The torque converter as defined in claim 4 wherein said switch valve is reversible and is connected between a source of fluid pressure and a cylinder having a piston connected to said control element, said switch valve having ports connected with opposite sides of said cylinder.

6. The torque converter as defined in claim 5 wherein between each of said ports and the respective side of said cylinder there is provided in parallel a check valve and a throttle, the check valve affording unrestricted passage of fluid to the respective side of the cylinder.

7. The torque converter as defined in claim 6 wherein said gear transmission has one clutch providing a direct connection between said motor and said output shaft and the other clutch providing a speed-reducing connection between said motor and said output shaft.

* * * * *